UNITED STATES PATENT OFFICE.

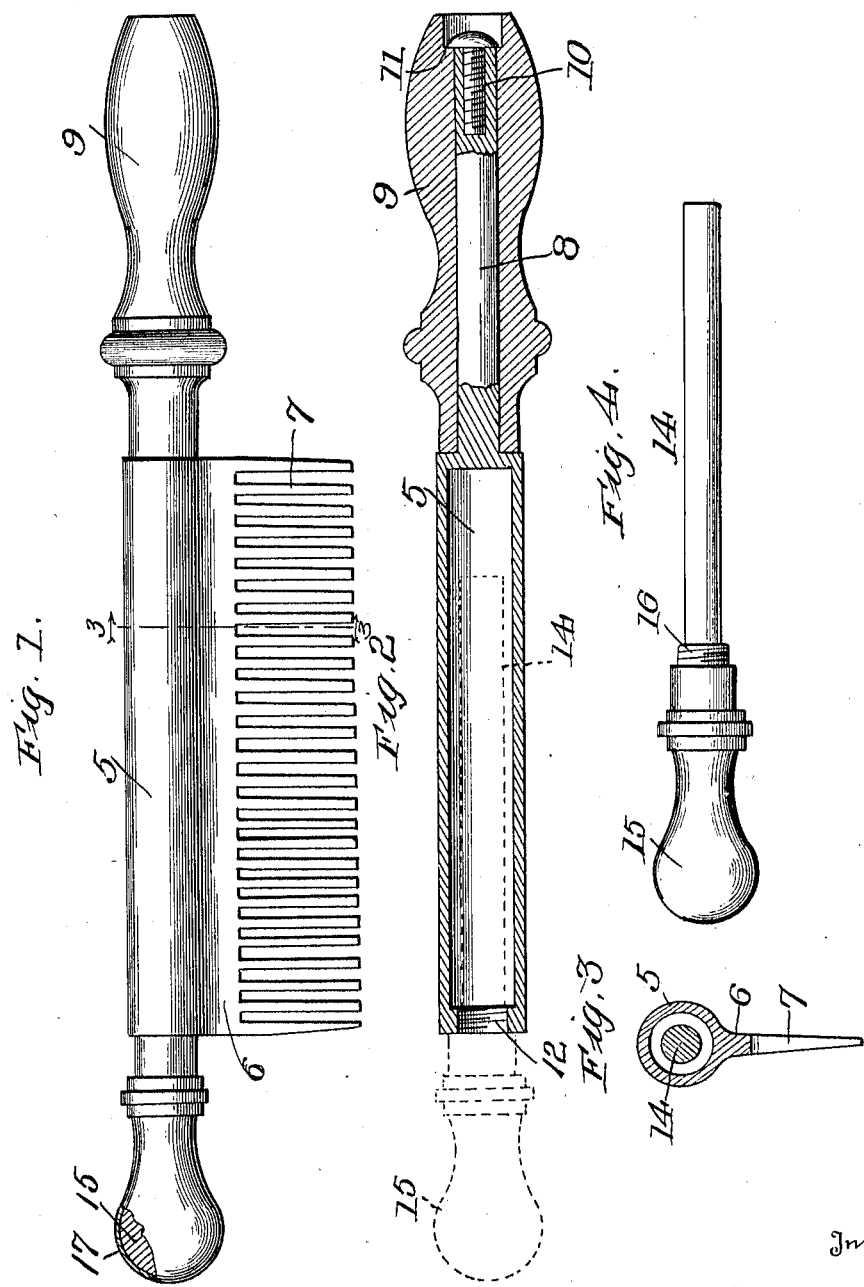

EMILIA BAUM, OF NEW YORK, N. Y.

HAIR-DRYING COMB.

1,096,666.

Specification of Letters Patent. Patented May 12, 1914.

Application filed January 22, 1914. Serial No. 813,680.

*To all whom it may concern:*

Be it known that I, EMILIA BAUM, a citizen of the United States of America, residing at New York, in the county of New York and State of New York, have invented certain new and useful Improvements in Hair-Drying Combs, of which the following is a specification.

This invention relates to certain new and useful improvements in hair drying combs, and relates more specifically to a comb adapted particularly for use in combing and drying ladies' hair after the same has been washed or shampooed.

The invention has for its object the provision of a novel and effective device for the above purpose of comparatively simple and inexpensive construction, and which may be easily maintained in a sanitary condition.

A further object is to provide a device of this type having sufficient chamber area for the heating-iron to provide for the retention of a sufficient amount of heated air that the comb-head will be maintained warm for considerable length of time.

With the above and other objects in view, as will appear as the invention is hereinafter more fully described and claimed, the invention resides in the novel construction, combination, and arrangement of parts, reference being had in the description to the accompanying drawings forming a part of this specification, and wherein like numerals of reference will be employed to designate like parts throughout the different views, in which:—

Figure 1 is a view in side elevation of a comb constructed in accordance with my invention, the heating iron handle being partly broken away. Fig. 2 is a longitudinal sectional view through the comb-head and the main handle, the heating iron and its handle being shown in dotted lines. Fig. 3 is a transverse vertical sectional view through the comb-head on line 3—3 of Fig. 1. Fig. 4 is a detached view of the heating iron in side elevation.

To put my invention into practice, I provide a hollow comb-head 5, which has a fin or web 6 projecting laterally from one side throughout the length of the comb-head which tapers on both sides toward its free edge, and the major portion of which is slotted inwardly from the free edge to form the comb teeth 7. This comb-head is closed at one end, and projecting from this closed end is a stem 8 which receives a suitable handle 9, a convenient means of securing the handle on the stem being by the employment of a screw 10 engaging in a threaded recess in the outer end of the stem and having its head of a diameter greater than the stem so as to overlap upon shoulders 11 at the base of a recess provided with a screw head in the outer end of the handle 9. At its other or open end, the comb-head is provided with an interior annular nut 12, the opening in this nut being slightly larger in diameter than the diameter of a heating iron 14 that is insertible into the hollow head 5 through said nut.

The heating iron 14 is carried by a handle 15, and is securely held within the hollow head 5 by an exteriorly threaded boss 16 which engages with the threads of nut 12. The heating iron 14 and its handle 15 may be turned from a single piece of material, or the handle 15 may be of insulating material, or may be provided with an insulation covering as 17 as shown, so that the heat from the heating iron will not be transmitted to the handle 15.

The comb may be made from any suitable material, though in practice I have generally made the comb-head and stem and the heating iron from metal, brass generally being used. The heating iron by reason of its being of relatively smaller diameter than the diameter of the chamber in the head 5 provides for a space entirely around the iron to heat the air within the chamber so that the head will remain warm for considerable length of time. By reason of its relatively small diameter, the heating iron can be used for a curling iron when desired, and the method of securing the heating iron firmly within the comb-head provides for a ready removal of the same to heat it when desired, and by the provision of the threaded boss 16 and nut 12, the heat given off by the heating iron within the chamber 5 is securely retained within said chamber, thus maintaining a relatively uniform heating of the comb-head for considerable length of time.

While I have herein shown and described in detail the construction of a preferred embodiment of my invention, it will be obvious that various slight changes may be made in the details of construction without departing from the spirit of the invention as claimed.

Having fully described my invention, what I claim is:—

A hair drying comb comprising a hollow comb-head having an integral stem at one end, a handle fitted on said stem, the other end of said head having an interior annular threaded nut, a heating-iron insertible into the hollow comb-head through the nut and bodily removable from the comb-head, a handle carrying said heating-iron, and a threaded boss at the inner end of the handle engaging the interior nut in the comb-head to secure the heating-iron therein.

In testimony whereof I affix my signature in presence of two witnesses.

EMILIA BAUM.

Witnesses:
WILLIAM A. CROSBY,
PASQUALE CLEMENTE.